Figure 1:
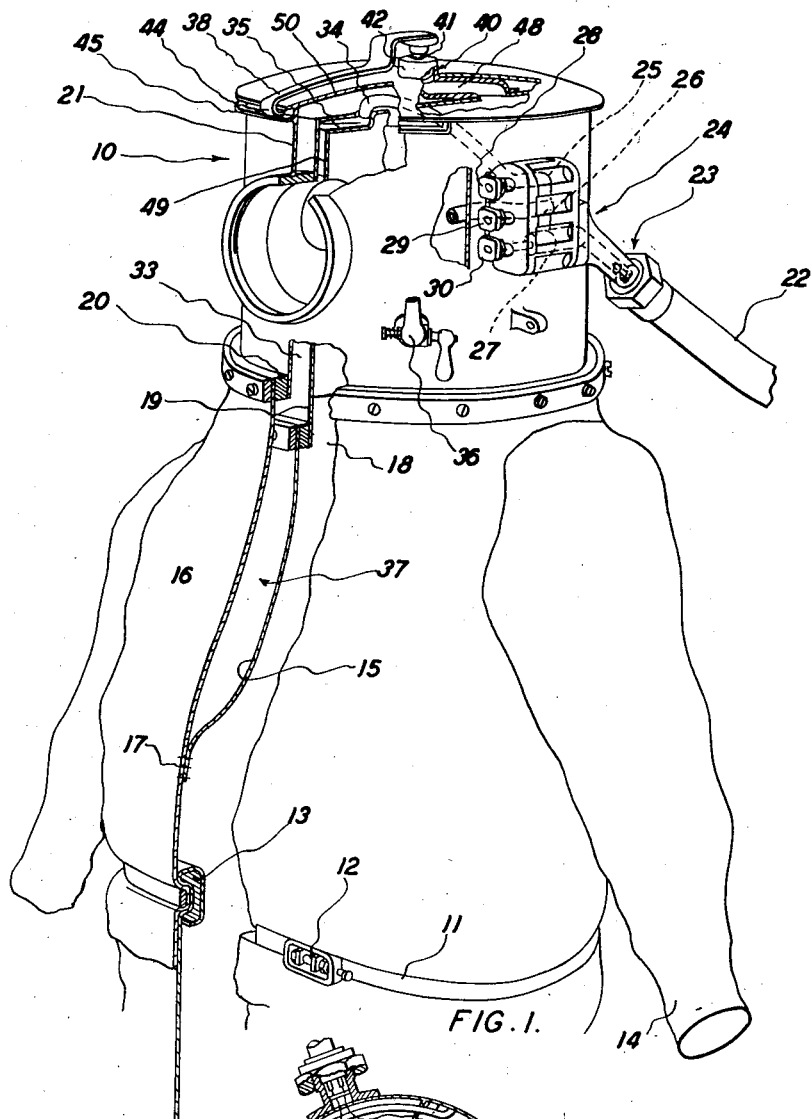

June 22, 1937. E. R. CLIFFORD 2,084,520
DIVING DRESS
Filed Sept. 17, 1934

Inventor:
E. R. Clifford
By E. F. Wendworth
Atty

Patented June 22, 1937

2,084,520

UNITED STATES PATENT OFFICE 2,084,520

DIVING DRESS

Ernest Reginald Clifford, Five Dock, near Sydney, Australia, assignor to The Austral Submarine Inventions Limited, Sydney, New South Wales, Australia, a company of New South Wales Application September 17, 1934, Serial No. 744,453
In Australia October 7, 1933

5 Claims. (Cl. 61—70)

It is known that the presence of carbon dioxide in air which is respired by submarine divers produces physiological effects which result in increase in the rate at which nitrogen is taken into the diver's blood and tissues. Even when the percentage of carbon dioxide in the respiration air is so low that it would be negligible in open atmosphere, its effects when it is contained in the air which is inspired by a diver when he is submerged may produce serious discomfort and exhaustion and may cause serious physical injury or even produce lethal effect.

Carbon dioxide is given off in respiratory exhalations and is otherwise rejected from the diver's body, and in known forms of diving dresses some of it is diffused in the inspiration air which is supplied to the diver through the pumping apparatus. When a diver exerts himself, the rate of his discharge of carbon dioxide rises rapidly, resulting in increase in volume of respiration and increase in the rate of circulation of his blood. The period otherwise required to reach saturation with nitrogen is thus abridged and consequently rapid decompression risks are exalted.

It is consequently necessary that the content of carbon dioxide in the air which the diver inspires shall be limited to minimum. Pure air carries about .03%–.04% of $CO_2$. Exhaled air carries about 5.6% carbon dioxide at normal pressure.

When the partial pressure of carbon dioxide is higher than the normal atmospheric content the diver suffers distress while submerged.

Breathing is, however, easy, even at 15 fathoms, if the ventilation is adequate, but existing diving apparatus does not provide the necessary degree of ventilation. It has been observed by tests in an experimental chamber that no oppression in breathing is experienced by men in a normal atmosphere under pressure of about 80 lbs. per square inch, but that the presence of any substantial percentage of $CO_2$ in the atmosphere results in oppression. Alveolar air contains approximately 5.6% of $CO_2$. Even slight increase in the proportion of $CO_2$ in the inspired air necessitates more energetic lung action to keep the carbon dioxide proportion in the alveolar air constant, and consequent distress is experienced by the diver, particularly when muscular work is being performed; muscular activity results in increased production of $CO_2$ in the lungs, even as much as seven or eight times the normal rate. If the inspired air contains 3% $CO_2$ the volume of such air which will be inspired will be twice the normal rate in order that the natural process in the lungs in which further $CO_2$ is generated will not cause a rise above about 5.6%. Under a pressure of 70 lbs. per square inch, less than 10% of $CO_2$ in the inspired air will cause distressful panting.

As the diver exhales spent air containing a high proportion of $CO_2$ into the helmet of any known diving dress, and as this exhaled spent air at once diffuses to a greater or less extent with incoming fresh air, the diver is caused to inspire air which is foul with $CO_2$; he is compelled, therefore, to breathe more deeply and more frequently, and consequently absorption of nitrogen into his blood and tissues is promoted. The effect on the diver is thus cumulative, for the more he breathes from the atmosphere into which he exhales, the proportion of $CO_2$ will become progressively higher.

With 2% of $CO_2$ in the air the normal rate of inspiration of air is increased 50%, with 3% it is increased 100%, with 4% it is increased 200%, and with 6% it is increased 500%. The last mentioned proportion causes severe panting and headache, and higher percentages cause loss of consciousness or anaesthesia.

The more ample the air supply and the lower the proportion of $CO_2$ therein the more is the diver's work facilitated, and his distress, exhaustion and risk diminished.

Figure 2:
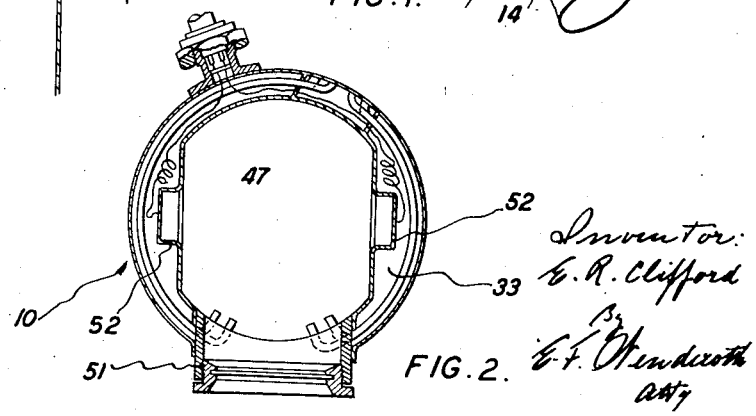

Insofar as the muscular activities of divers are impeded and insofar as divers are discomforted and exposed to risk by the presence of $CO_2$ in the inspiration air, the present invention offers an effective remedy by providing an arrangement by which diffusion of exhaled air and gas with the inspiration air is prevented. These means will now be described with reference to the accompanying drawing, which in Fig. 1 is a perspective view of a diving dress with parts shown torn open to expose interior parts to view, and Fig. 2 is an horizontal section through the helmet of the dress.

The helmet 10 is constructed of metal. The other parts of the dress are constructed of stout waterproof fabrics.

The parts of the suit below the waistline are single walled, that is to say the walls do not contain any cavities, or the suit may be in one unit—neck to feet. The nether part of the suit is bound to the tunic or corselet by a metal clamp band 11 fitted with screw clamps 12, coacting with a grooved metal band 13 which locates about the diver's waist, with ample freedom to permit him to move freely within it. The lower ends of the legs (not shown) are booted as usual and prevent water inflow into the dress. The sleeves of the tunic finish in the usual flexible rubber wristlets 14 which are adapted to embrace the diver's wrists tightly.

The corselet or tunic is double walled in the upper portion of it. The bottom of the inner wall 15 is united to the outer wall 16 by an air tight seam 17. At the neck the inner wall 15 is permanently or detachably fixed to an inner collar 18 at the base of the inner wall 19 of the helmet, and the outer wall 16 is permanently fixed to an outer collar 20 on the base of the helmet shell 21. An inflatable "knapsack" of metal or woven material which may be rubberized, may be fixed to the back of the tunic to carry a reserve volume of air under pressure for buoyancy or for transfer into the helmet (under immediate control of the diver) to supply respiration demands in the event of the pump air line 22 being broken or choking or the air service fouling while the diver is submerged. The cellular air space in the tunic wall may be divided by a mid-septum to form two inflation chambers not in direct communication with each other.

Air is brought to the dress from the pumps on a ship's deck or other over-water support through a flexible air hose 22. 23 is a check valve which prevents movement of air backward from the helmet cavity to the hose 22. The manifold 24 contains one chamber leading to three separate chambers 25, 26 and 27, to which air from the air pipe 22 is admitted through three valves which are respectively controllable independently of each other by hand knobs 28, 29 and 30; which are disposed conveniently for manipulation by the diver while he is submerged. The chamber 27 is connected with the hose 22 and also (on the rear side of the valve) with the chambers 25 and 26. The valve 30 is so constructed that it may be operated to close the air supply service from the pipe 22, or to permit delivery of air from that pipe to the chambers 25 and 26 at any desired rate. From the chamber 26 air is admitted under control of the valve 29 to the annular buoyancy cell 33 in the helmet, and to the buoyancy cell 37 between the inner and outer walls of the tunic. From the chamber 25 air for inspiration is admitted via the valve 28 in that chamber through a pipe 34 to the air service chamber 35 in the upper part of the central chamber 47 of the helmet. If a buoyancy and reserve air knapsack is fitted to the dress, it is supplied with high pressure air direct from the valve chamber 26 through a cock (not shown) which is under the control of the diver, and air to replenish inspiration air can be taken from it as required by the diver. 36 is a spitcock, also controllable by the diver, for releasing air from the buoyancy chambers 33 and 37. 40 is an air release valve in the top of the helmet. This valve is a poppet type valve held to its seat by a light helical spring. The tension of this spring is adjustable by moving the quadrant lever 38 to turn a screw upon which the spring takes its abutment. The screw is formed on the spindle 41 to which the lever butt is attached, and it works in a tapped hole in the top of the nipple 42. The valve seat is at the bottom of the nipple, and air discharge vents are formed in the sides of the nipple. The outer end 44 of the lever is clinched into the quadrant grooveway 45 in the rim of the helmet but so as to be movable frictionally therein. This arrangement is provided for protection of the lever against accidental disturbance after manual adjustment. The rotational position of the lever end 44 in the grooveway 45 determines the degree of tension on the valve release spring and consequently the loading on the valve which influences it towards its seat.

The helmet is double-walled and contains a central chamber 47 in which the diver's head is accommodated, an annular buoyancy space 33 surrounding that chamber and covering it, and a pipe 48 from the rear upper part of the central chamber 47 to the release valve 40. The air service chamber 35 is in the top frontal part of the central chamber 47. The fresh air supply pipe 34 connects the valve chamber 25 with the air service chamber 35. The air release valve vent is in the top side of the outer shell 21 of the helmet. An apron 49 is positioned in front of the diver's forehead, depending within the inner chamber 47 from the floor of the air service chamber 35. The annular chamber 33 is in free communication with the top chamber 50.

The sight window (or windows) casing 51 extends across the annular chamber 33 and it is glazed with heavy glass in the usual way. Telephone terminals are accommodated in pockets 52 in the inner wall 19 of the helmet.

The helmet structure which has been described is designed to provide a positive uniflow course for the respiration air flow from entry to exit, and is designed also to inhibit diffusion of exhaled air and gases into the inspiration air, which under all circumstances is thus maintained in substantially untainted condition. This essential condition of success results from the fact that a constant current of fresh air for inspiration is directed as a veil downwardly over the diver's face, that he inspires fresh air directly from this current, and that the air and gases he exhales are swept downward and backward and thence upward through the tube 48 to the release valve 40 in the upper part of the helmet. Incidentally the current of fresh air flooding over the inner face of the sight window prevents precipitation of exhaled aqueous vapor upon it. As the incoming air flows in an unbroken current in fresh condition downwardly over the diver's nose and mouth, and as the exhaled air and gases are prevented from diffusing into it before it is inspired by the diver, the diver always inspires air which contains only the proportion of $CO_2$ which is found in the open atmosphere from which it is taken by the pumps.

In operation, the diver adjusts the valve 25 to admit fresh air at the desired rate into the helmet and he adjusts the valve 40 to permit release of respired air from the helmet, and he thus regulates circulation of air through the helmet at the rate at which comfortable respiration conditions are maintained. He also governs his buoyancy by manipulating the valves 26 and 36, either filling or discharging the buoyancy chambers as and when desired; he is thus provided with all necessary means for controlling his buoyancy in descending and in ascending.

Repeated trial uses of this dress have established the fact that it enables a diver to work for at least an hour or more submerged at thirty fathoms and at the end of that time to come directly to the surface in the space of 3½ minutes or less without experiencing the discomfort and risk which he would experience if he used a diving dress of conventional design in which adequate provision is not made for maintaining the inspiration air in pure condition and evacuating the spent air as rapidly as it is exhaled.

The helmet is dimensioned and designed to function as a buoyancy chamber having sufficient buoyancy to maintain the diver in normally erect position.

What I claim as my invention and desire to secure by Letters Patent is:—

1. A diver's helmet, comprising a casing or helmet portion, an air hose leading to said helmet, a manifold on said helmet to which said air hose leads, a double wall in said helmet, means leading the air from said manifold past the face of the user of the helmet, means then leading the exhaust air downwardly, rearwardly and then upwardly in the helmet, and means for discharging the air from the top of the helmet.

2. A diver's helmet, comprising a casing or helmet portion, an air hose leading to said helmet, a manifold on said helmet to which said air hose leads, a double wall in said helmet, means leading the air from said manifold past the face of the user of the helmet, means then leading the exhaust air downwardly, rearwardly and then upwardly in the helmet, means for discharging the air from the top of the helmet, and means for controlling the flow of exhaust air through said last-mentioned means.

3. A diver's helmet, comprising a casing or helmet portion, an inflatable tunic portion secured to but pneumatically separate from said casing, an air hose leading to said helmet, a manifold on said helmet to which said air hose leads, ports leading off from said manifolds, a petcock in said tunic portion, one of said ports leading to said tunic and said petcock controlling the inflation of the tunic portion and hence the buoyancy of the diver, a double wall in said helmet, another port from said manifold leading to said double wall, means leading the exhaust air downwardly, rearwardly and then upwardly in the helmet, a release valve in the top of the helmet, and means controlling said valve, manipulation by the diver of the corresponding manifold valve and the release valve controlling the rate of flow through the helmet.

4. A diving dress helmet having a valved vent in the upper part of it, a central air chamber, an air service chamber above said central chamber, a valve controllable by the diver for admitting respiration air to said air service chamber, said chamber having an apron front adapted to direct fresh incoming air downwardly and to spread said air as a veil within the frontal part of the central chamber, and means for educting exhaled air and gas from the central chamber to the valved vent in the upper part of the helmet.

5. A diving dress helmet comprising a central air chamber, an annular buoyancy cell surrounding said chamber and covering it, means controllable by the diver for admitting air to and releasing air from said cell, an air release valve in the upper part of the helmet, a pipe connection from the rear upper part of said chamber to said air release valve, an air service chamber in the top frontal part of the central chamber, a plurality of control valves fitted to said helmet and arranged for manipulation by the diver when submerged, said valves adapted for controlling the rate of supply of respiration air to the central chamber of the helmet through said air service chamber, said air service chamber being structurally adapted for directing said respiration air downwardly from said air service chamber as a veil within the frontal part of the central chamber so as to drive exhaled air and gas and surplus respiration air before it to the release valve in the upper part of the helmet, thereby to ensure an unvitiated atmosphere in the frontal zone of the central chamber, and other valves also controllable by the diver for admitting air to and releasing air from said buoyancy cell.

ERNEST REGINALD CLIFFORD.